United States Patent
Giusti et al.

(10) Patent No.: US 11,740,212 B2
(45) Date of Patent: Aug. 29, 2023

(54) METHOD FOR DETECTING AND QUANTIFYING OXYGEN IN OXIDIZABLE COMPOUNDS BY OXIDIZING A SAMPLE WITH AN ISOTOPIC OXYGEN COMPOSITION DIFFERENT FROM NATURAL ABUNDANCE

(71) Applicants: TOTALENERGIES ONETECH, Courbevoie (FR); UNIVERSIDAD DE OVIEDO, Oviedo (ES); UNIVERSITE DE PAU ET DU PAYS DE L'ADOUR, Pau (FR); CENTRE NATIONAL DE LA RECHERCHE SCIENTIFIQUE (CNRS), Paris (FR)

(72) Inventors: Pierre Giusti, Le Havre (FR); Jorge Ruiz Encinar, Oviedo (ES); Mariella Moldovan, Oviedo (ES); Brice Bouyssiere, Serres Morlaas (FR)

(73) Assignees: TOTALENERGIES ONETECH, Courbevoie (FR); UNIVERSIDAD DE OVIEDO, Oviedo (ES); UNIVERSITE DE PAU ET DES PAYS DE L'ADOUR; CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 501 days.

(21) Appl. No.: 16/063,605

(22) PCT Filed: Dec. 14, 2016

(86) PCT No.: PCT/EP2016/080892
§ 371 (c)(1),
(2) Date: Jun. 18, 2018

(87) PCT Pub. No.: WO2017/114654
PCT Pub. Date: Jul. 6, 2017

(65) Prior Publication Data
US 2019/0004019 A1    Jan. 3, 2019

(30) Foreign Application Priority Data

Dec. 29, 2015    (EP) .................................. 15382670

(51) Int. Cl.
G01N 31/00    (2006.01)
G01N 31/12    (2006.01)

(52) U.S. Cl.
CPC ........... *G01N 31/005* (2013.01); *G01N 31/12* (2013.01)

(58) Field of Classification Search
CPC ....... G01N 31/00; G01N 31/12; G01N 31/005
(Continued)

(56) References Cited

U.S. PATENT DOCUMENTS 3,128,325 A * 4/1964 Keaty ...................... H05B 3/66
                                                            373/111
3,298,786 A * 1/1967 Hinsvark ............... G01N 31/00
                                                            436/127

(Continued)

FOREIGN PATENT DOCUMENTS

EP    1939617 A1    7/2008

OTHER PUBLICATIONS

Grosse, A. V. et al, Journal of the American Chemical Society 1946, 68, 2119.*

(Continued)

*Primary Examiner* — Arlen Soderquist
(74) *Attorney, Agent, or Firm* — Sughrue Mion, PLLC

(57) ABSTRACT

The present invention concerns an analytical method that makes use of an oxygen-containing source having a predetermined content of an isotope of oxygen $^ZO$, which is not the same as natural composition and distribution of oxygen isotopes, to detect and/or quantify oxygen in oxidizable compound(s).

(Continued)

The analytical method allows detecting and/or quantification with relatively high precision and accuracy oxygen in oxidizable compound(s), even at low content. The method is easy to implement and can be used for in-line analysis.

23 Claims, 2 Drawing Sheets

(58) Field of Classification Search
USPC .................................................. 436/127–132
See application file for complete search history.

(56) References Cited

U.S. PATENT DOCUMENTS

| | | | | |
|---|---|---|---|---|
| 3,374,064 A * | 3/1968 | Kolsto | ................... | G01N 31/12 422/78 |
| 3,408,269 A * | 10/1968 | Hersch | ............... | G01N 27/4045 205/785.5 |
| 3,801,669 A * | 4/1974 | Christmann | ............. | B01J 23/04 585/621 |
| 3,869,613 A * | 3/1975 | Link | ................... | G01N 21/3518 250/343 |
| 3,945,799 A * | 3/1976 | Honma | ................ | G01N 31/005 436/127 |
| 4,066,411 A * | 1/1978 | Fine | ........................ | G01N 30/84 422/70 |
| 4,517,461 A * | 5/1985 | Crandall | ................ | B01D 59/44 250/281 |
| 4,686,317 A * | 8/1987 | Quann | ................... | C10G 21/00 208/322 |
| 4,798,805 A * | 1/1989 | Issenmann | ............. | G01N 31/12 422/54 |
| 4,866,270 A * | 9/1989 | Hall | ................... | G01N 30/7206 250/282 |
| 4,916,313 A * | 4/1990 | Hall | ................... | G01N 30/7206 250/282 |
| 5,012,052 A * | 4/1991 | Hayes | ................ | G01N 30/7206 250/282 |
| 5,019,517 A * | 5/1991 | Coulson | ................. | G01N 30/64 324/451 |
| 5,314,827 A * | 5/1994 | Schmidt | ................ | B01D 59/44 250/282 |
| 5,424,539 A * | 6/1995 | Brand | ..................... | G01N 30/10 250/282 |
| 5,432,344 A * | 7/1995 | Brand | ................ | G01N 30/7206 250/288 |
| 5,501,981 A * | 3/1996 | Ray | ...................... | G01N 21/766 436/123 |
| 5,783,741 A * | 7/1998 | Ellis | .................... | H01J 49/0422 250/288 |
| 5,864,576 A * | 1/1999 | Nakatani | ................. | F27D 11/02 373/125 |
| 5,916,523 A * | 6/1999 | Yan | ...................... | G01N 21/766 422/83 |
| 2003/0049855 A1* | 3/2003 | Rhodes | ............... | G01N 33/0014 436/117 |
| 2003/0205077 A1* | 11/2003 | Staphanos | ............ | G01N 33/004 73/19.1 |
| 2004/0151630 A1* | 8/2004 | Hernandez, Jr. | ........ | G01N 31/12 422/80 |
| 2008/0260587 A1* | 10/2008 | Coleman | .............. | G01N 33/004 422/89 |
| 2010/0055802 A1* | 3/2010 | Zare | ........................ | G01N 30/74 436/158 |
| 2010/0101304 A1* | 4/2010 | McIntyre | ............... | G01N 30/84 73/23.37 |
| 2010/0212398 A1* | 8/2010 | Krummen | ............. | G01N 31/12 73/23.37 |
| 2011/0027161 A1* | 2/2011 | Krummen | ............ | G01N 1/4044 423/351 |
| 2011/0250582 A1* | 10/2011 | Gates | ..................... | C12M 41/34 435/3 |
| 2013/0037707 A1* | 2/2013 | Lamberti | ............. | G01N 33/241 250/282 |
| 2014/0013658 A1* | 1/2014 | Silverman | ................ | C12N 9/93 44/308 |
| 2015/0348768 A1 | 12/2015 | Lee et al. | | |
| 2016/0177711 A1* | 6/2016 | Calleri | ................. | G01N 33/241 73/152.04 |

OTHER PUBLICATIONS

Grosse, A. V. et al, Analytical Chemistry 1949, 21, 386-390.*
Grosse, A. V. et al, Analytical Chemistry 1952, 24, 584-585.*
Kuck, J. A. et al, Analytical Chemistry 1967,39, 1249-1254.*
Culmo, R., Mikrochimica Acta 1968, 811-815.*
Oita, I.J., Analytical Chemistry 1984, 56, 1155-1158.*
Zeng, K.-W. et al, Spectrochimica Acta 1985, 40B 349-356.*
Santrock, J. et al, Analytical Chemistry 1985, 57, 1444-1448.*
Yu, W.-L., Journal of Analytical Atomic Spectrometry 1988, 3, 893-900.*
Begley, I. S. et al, Analytical Chemistry 1997, 69, 1530-1535.*
Schoeller, D. A. et al, Journal of Mass Spectrometry 1997, 32, 1332-1336.*
Venter, A. et al, Journal of Chromatography A 1999, 847, 309-321.*
Lancaster, J. S. et al, Journal of High Resolution Chromatography 2000, 23, (7/8) 479-484.*
Gehre, M. et al, Rapid Communications in Mass Spectrometry 2003, 17, 1497-1503.*
De Zeeuw, J et al, Journal of Chromatographic Science 2003, 41, 535-544.*
Sessions, A. L., Journal of Separation Science 2006, 29, 1946-1961.*
Yamada, K. et al, Rapid Communications in Mass Spectrometry 2007, 21, 1431-1437.*
Watanabe, T. et al, Taianta 2007, 72, 1655-1658.*
Sacks, G. L. et al, Analytical Chemistry 2007, 79, 6348-6358.*
Luong, J. et al, Journal of Chromatographic Science 2007, 45, 664-670.*
Schipilliti, L. et al, Journal of Separation Science 2010, 33, 617-625.*
Omais, B. et al, Journal of Chromatography A 2012, 1226 61-70.*
Tipler, A. et al, Journal of Chromatographic Science 2012, 50, 184-189.*
Hexana, W. ert al, Journal of Separation Science 2014, 37, 566-572.*
Maduskar, S. et al, Lab on a Chip 2015, 15, 440-447.*
Holowchak, J. et al, Analytical Chemistry 1951, 23, 1404-1407.*
Kirshenbaum, A. D. et al, Analytical Chemistry 1952, 24, 1361-1362.*
Kirshenbaum, A. D. et al, Analytical Chemistry 1953, 25, 638-640.*
Olson, P. B. et al, Mikrochimica Acta 1970, 403-412.*
Chace, D. H. et al, Biomedical and Environmental Mass Spectrometry 1990, 19, 117-122.*
Goodman, K. J. et al, Analytical Chemistry 1992, 64, 1088-1095.*
Kusmierz, J. J. et al, Biological Mass Spectrometry 1993, 22, 537-543.*
Goodman, K. J. et al, Analytical Chemistry 1994, 66, 1294-1301.*
Zeng, Y. et al, Analytica Chimica Acta vol. 1994, 289, 195-204.*
Merritt, D. A. et al, Analytical Chemistry 1995, 67, 2461-2473.*
Dube, G. et al, Metrologia 1997, 34, 83-86.*
Hener, U. et al, Zeitschrift für Lebensmittel-Untersuchung und -Forschung A 1998, 206, 230-232.*
Juchelka, D. et al, Journal of High Resolution Chromatography 1998, 21, 145-151.*
Meier-Augenstein, A., Journal of Chromatography A, 1999, 842, 351-371.*
Loader, N. J. et al, Rapid Communications in Mass Spectrometry 1999, 13, 1828-1832.*
Preston, C. et al, Journal of Agricultural and Food Chemistry 2003, 51, 8027-8031.*
Heilmann, J. et al, Analytical Chemistry 2008, 80, 1952-1961.*
Diaz, S. C. et al, Angewandte Chemie International Edition 2009, 48, 2561-2564.*

(56) References Cited

OTHER PUBLICATIONS

Calderone, G. et al, Rapid Communications in Mass Spectrometry 2009; 23: 963-970.*
Zare, R. N. et al, Proceedings of the National Academy of Sciences of the United States of America 2009, 106, 10928-10932.*
Diaz, S. C. et al, Analytical Chemistry 2010, 82, 6862-6869, and 6 pages of Supporting Information.*
Carter, J. F et al (Eds), Good Practice Guide for Isotope Ratio Mass Spectrometry FIRMS 2011, 48 pages.*
Garbe, L.-A. et al, Brewing Science 2011, 64, 140-150.*
Sobrado, L. A. et al, Journal of Chromatography A 2015, 1419, 99-108.*
Meier-Augenstein, W., Rapid Communications in Mass Spectrometry 1997, 11, 1775-1780.*
Lobinski, R. et al, Spectrochimica Acta Part B 1997, 52, 1865-1903.*
Jasper, J. P., Rapid Communications in Mass Spectrometry 2001, 15, 1554-1557.*
Molinie, R. et al, Rapid Communications in Mass Spectrometry 2009, 23, 4031-4037.*
Kioussi, M. K. et al, Journal of Chromatography A 2011, 1218, 5675-5682.*
Meade, C. F. et al, Analytical Chmistry 1967, 39 512-516. (Year: 1967).*
Verga, G. R. et al, Journal of High Resolution Chromatography & Chromatography Communications 1988, 11, 248-252. (Year: 1988).*
International Search Report issued in PCT/EP2016/080892, dated Mar. 9, 2017, 4 pages.
T.M. Bahrainwala et al., "Elemental Analysis by Isotope Dilution", Encyclopedia of Analytical Chemistry, Chichester, UK, John Wiley & Sons, Ltd, (Sep. 15, 2006), 17 pages.
M.L. Pearce and C.R. Masson, "Determination of Oxygen in Iron and Steel", Nature, 1960, 185, pp. 373-374.
J.P. Burden, C.R Masson; "Modified isotope dilution technique for the determination of oxygen in iron and steel"; J. Iron Steel Inst., 202(1), 1964; pp. 28-31.
Velmer A. Fassel, "Emission spectrometric determination of oxygen, nitrogen, and hydrogen in metals"; pp. 103-120; The Iron and Steel Institute; 1960.

\* cited by examiner

METHOD FOR DETECTING AND QUANTIFYING OXYGEN IN OXIDIZABLE COMPOUNDS BY OXIDIZING A SAMPLE WITH AN ISOTOPIC OXYGEN COMPOSITION DIFFERENT FROM NATURAL ABUNDANCE

CROSS-REFERENCE TO RELATED APPLICATIONS

This application claims the benefit of PCT/EP2016/080892 filed Dec. 14, 2016, which claims priority from EP 15382670.6 filed Dec. 29, 2015, which are incorporated herein by reference in their entireties for all purposes.

FIELD OF THE INVENTION

The present invention relates to the field of analytical chemistry and, more specifically, relates to a method for analyzing oxygen, in particular for detecting and/or quantifying oxygen, in particular elementary oxygen, issued from, or within oxidizable compounds, and especially organic compound(s). In particular, the method permits to determine simply the oxygen content or the presence of oxygen, even at low oxygen content.

The present invention relates to an analytical method using an isotopic oxidative reaction of the oxidizable compound(s) to analyze. By "isotopic oxidative reaction", we mean an oxidation reaction performed in presence of isotopic oxidizing agent. An isotopic oxidizing agent is defined as a substance which presents a predetermined content of an oxygen isotope, in other words a substance having an oxygen isotopic ratio different from the natural oxygen isotopic ratio, also called natural abundance. A suitable isotopic oxidative method according to the invention may be combustion by any means, such as thermal or non-thermal combustion, using conventional flame ignition or using a plasma source, or any energy carrying radiation suitable to reach any molecular/atomic electronic energy transition state necessary to obtain total oxidation of products to be oxidized.

The invention can be used for detecting the presence of oxygen in a mixture of oxidizable compounds, preferably organic compounds, or in a single oxidizable compound.

Alternatively or in combination, the invention can be used for a relatively precise determination of oxygen content of a mixture of oxidizable compounds, preferably organic compounds, or of a single oxidizable compound. The method also permits a determination of the amount of oxygen-containing oxidizable compound in a mixture of oxidizable compounds. In particular, the method can be used for measuring the oxygen content of hydrocarbons feedstocks or effluents of a refinery.

BACKGROUND OF THE INVENTION

An existing quantification method of elementary oxygen in organic compounds comprises the passage of the compound(s) to analyze in a gas chromatography (GC) and then in a flame ionization detector (FID) after pyrolysis and methanization steps. However, this method is indirect, not very sensitive (detection limit around 100 ppm) and limited to light fractions due to its sensitivity to co-elution in the GC. This method is not very accurate as the result obtained is in weight percent. Moreover, this method is sensible to the nature of the organic compound.

Another existing method consists in measuring the total content of elementary oxygen in a sample using a CHNOS elemental analysis. However, the limit of detection of CHNOS analyzers is about 1000 ppm.

It is also possible to use a method with neutron activation to add neutrons to the oxygen present so as to emit gamma radiations which can be measured with a limit of detection about 1 ppm. This method is very accurate but requires a nuclear reactor and cannot be used for in-line measurements.

Other oxygen determination methods are known for iron and steel samples. For example, it is known to determine oxygen content of a metal sample by molting the metal sample in a graphitic crucible under argon atmosphere. The molten steel specimen dissolves enough carbon from the crucible to cause reduction of the oxide present in the metal to carbon monoxide, which is evolved into the argon atmosphere and measured. The use of the isotope dilution by adding a know amount of $C^{18}O$ to the argon atmosphere has been disclosed (M. L. Pearce and C. R. Mason, Nature, 1960, 185, 373-374). It has also been reported to introduce a known volume of $^{18}O$ into the argon atmosphere, the metal sample being heated to dull red which causes $^{18}O$ to form oxides with metallic elements of the sample. The sample is then molten in the graphite crucible and $C^{18}O$ and $C^{16}O$ originated from oxides present in the metallic sample are liberated jointly when the metal sample fuses (J. P. Burden, C. R Masson, *J. Iron Steel Inst.*, 202(1), 28-31 (1964). Such methods are not adapted for measurement of oxygen in organic compounds.

There is therefore a need for a simple analytical method that can be used for in-line measurements and which permits to detect the presence of elementary oxygen and/or to measure the content of elementary oxygen in oxidizable compound(s), in particular in organic compound(s), or the content of oxygenated compounds in oxidizable compound(s), in particular organic compound(s), even at low content of oxygen.

Document US2015348768A1 discloses a combustion pretreatment-isotope dilution mass spectrometry measuring concentration of a target element for detection contained in a target sample for detection by using an isotope dilution mass spectrometry, including: pretreating the target sample for detection by combustion during an isotope dilution mass spectrometry, to thereby stabilize an isotope and further improve analysis ability. This method allows measuring concentration of the following elements: Cl, Br, Cd, Pb, Hg, Se, Li, B, Mg, Si, S, K, Ca, Ti, V, Cr, Fe, Ni, Cu, Zn, Ga, Ge, Rb, Sr, Zr, Mo, Ru, Pd, Ag, In, Sn, Sb, Te, Cs, Ba, Ce, Nd, Sm, Eu, Gd, Dy, Er, Yb, Hf, Ta, W, Re, Os, Ir, Pt, Tl, and U. The method uses an isotope dilution technique in which is used a reference sample enriched in a known amount of the isotope of the target element to measure. No oxygen determination is mentioned.

BRIEF SUMMARY OF THE INVENTION

An object of the present invention is an analytical method for oxygen analysis in an oxidizable compound or in a mixture of oxidizable compounds, comprising:

(a) providing a test sample containing, or consisting of, at least one oxidizable compound and a reference sample containing, or consisting of, at least one oxidizable reference compound which contains at least one chemical element, preferably different from O, present in the test sample, (b) submitting separately the test sample and the reference sample to the following steps under the same conditions:

(i) a step of complete oxidative reaction, in which the sample is submitted to an oxidizing medium containing at least one oxidizing agent under conditions efficient to completely oxidize the sample into gaseous oxidized species $A_aO_o$, where A is any chemical element different from O present in the sample, a is the number of A atoms, o is the number of O atoms, (ii) a step of detection, in which all the gaseous oxidized species $A_aO_o$, or some predetermined gaseous oxidized species $A_aO_o$, formed in step (i) are detected by means of a detector device adapted to detect gaseous oxidized species containing different isotopes of oxygen and to generate, for each detected gaseous species, a signal representative of the quantity of said detected gaseous species.

In the analytical method of the invention, the oxidizing medium contains a predetermined content of an isotope of oxygen $^zO$ that is not the same as natural composition and distribution of oxygen isotopes, where z is the mass number of the atom.

By using the appropriated detecting device mentioned, it is possible to differentiate all the oxidized species $A_a{}^zO_i{}^{16}O_{o-i}$ (where indicia i is an integer taking all the values from zero to o) containing different oxygen isotopes, including $^zO$ isotope. Thus, each signal generated by the detecting device is characteristic of a detected gaseous oxidized species $A_a{}^zO_o$ obtained at step (ii) and depends on the quantity of this detected gaseous species.

The signals obtained for the test sample and for the reference sample can then be further treated and compared for determination of the presence of oxygen and/or for quantification of oxygen.

When oxidizable compound(s) of the test sample provided step (a) is(are) organic compounds, the oxidizable reference sample preferably contains, or consists of, at least one reference compound which contains at least C, preferably at least C and H, and optionally N, S or any other chemical element, in particular any other chemical element also present in the test sample. In that case, in step (ii), A is C, optionally H, optionally any other chemical element different from O present in the sample.

Advantageously, in step (b) the test sample and the reference sample may be submitted separately, in any order, to steps (i) and (ii).

Advantageously, in step (b), the test sample and the reference sample may be volatilized prior to be submitted to step (i). Such volatilization may be performed by any adapted means, for example using a gas chromatography device.

Advantageously, the analytical method of the invention may comprise a further step of determination of the chemical formula of said at least one oxidizable compound contained in, or consisting, the test sample.

Advantageously, prior to step (i), the test sample, optionally mixed with the reference sample, may be introduced into a liquid or gas chromatography device to separate oxidizable compounds having different retention times, which are then submitted separately to steps (i) and (ii).

In this case, when a mixture of oxidizable compounds is concerned, the liquid or gas chromatography device permits to separate the oxidizable compound(s) contained in the mixture having different retention times. In other words, the oxidizable compounds contained in the mixture leave the liquid or gas chromatography device at particular retention times. Separation of the oxidizable compound(s) having different retention times, in particular sufficiently different retention time, is thus obtained. It should be noted that several oxidizable compounds having identical or overlapping retention time may not be separated by the gas or liquid chromatography device. The generated signals are then representative of the species formed from those oxidizable compounds having identical or overlapping retention time. The choice of appropriate chromatography device or conditions may allow avoiding such case by sufficiently separating the separated compound.

Thus, oxidizable compound(s) having different retention times can be submitted separately to the complete oxidative reaction of step (i), so that the gaseous oxidized species issued from oxidizable compound(s) of different retention times can be detected separately at the next step (ii), provided the retention times are sufficiently different. This allows generating signals characteristics of these oxidized species formed for each of the separated oxidizable compound(s) having a particular retention time, and optionally for the reference sample. This is particularly useful when the test sample contains several oxidizable compounds and a separate analysis of each of these compounds is wished, or if the test sample and reference sample are mixed. This is also useful when we are interested not only in the detection and quantification of elementary O in the sample but also in the individual O-containing species present.

The analytical method according to the invention may be used to determine if an oxidizable compound or a mixture of oxidizable compounds contains oxygen or not, in particular by extracting values from the treatment of signals of the gaseous oxidized species generated at step (ii), these values being characteristic of the oxidized species and depending on its content. Such values can be an intensity of the generated signal or the isotopic ratio of a detected species $A_aO_o$, or the area or height of a peak of a spectrogram, in particular a mass spectrogram, obtained from the treatment of the signals generated, in which a peak represents a single species $A_aO_o$ of a particular isotope of oxygen. Isotopic ratios can be computed by relating the peaks areas or heights.

To this effect, the reference sample preferably does not contain oxygen and the analytical method may comprise:
  in step (b), prior to step (i), the test sample, optionally mixed with the reference sample, is introduced into a liquid or gas chromatography device to separate oxidizable compounds having different retention times, which are then submitted separately to steps (i) and (ii).
  a further step (c) for each separated oxidizable compounds having different retention times, this step (c) including, for each gaseous oxidized species $A_aO_o$, or for some predetermined gaseous oxidized species $A_aO_o$, obtained from complete oxidation step (i):
  extracting compound test values from treatment of the signals generated by the detector device at step (ii) for said separated oxidizable compound, said compound test values being the values of each isotopic ratio $A_a{}^{16}O/A_a{}^zO_i{}^{16}O_{o-i}$ where indicia i is an integer taking all the values from zero to o, obtained from the corresponding oxidized species $A_aO_o$,
  extracting reference values from treatment of the signals generated by the detector device at step (ii) for the reference sample, said reference values being the values of each isotopic ratio $A_a{}^{16}O/A_a{}^zO_i{}^{16}O_{o-i}$ for which a compound test value has been determined,
  determining if the separated oxidizable compound contains oxygen by checking if at least one of its compound test values differs from the corresponding reference value.

This embodiment is particularly useful to detect the presence of oxygen in mixture of oxidizable compounds, or in a mixture of a single oxidizable compound with the reference sample.

Advantageously, it can be considered that an isotopic ratio differs from another isotopic ratio, if their difference is more important than a statistical difference observed for isotopic ratios of a same sample submitted at least twice to step (b).

The analytical method allows determination of the presence of oxygen, even at a low content of oxygen. By way of example, the detection limit expected with a detector such as a mass spectrometer is of the order of the wt ppb (part per billion).

The analytical method may also allow determining the quantity of oxygen in each of the oxidizable compound having a different retention time which contains oxygen.

To this effect, in any embodiment where the reference sample does not contain oxygen, the analytical method may comprise the following steps:

in step (a), the reference sample contains, or consists of, at least one reference compound in a known amount and the at least one reference compound contains at least one chemical element different from O present in said at least one oxidizable compound contained in, or consisting, the test sample, and wherein, when step (c) has determined that a separated oxidizable compound contains oxygen, the analytical method further comprises, for each separated oxidizable compound containing oxygen:

a quantification step (d) comprising:
  extracting from treatment of the signals generated by the detector device at step (ii) for this oxygen-containing separated oxidizable compound, values representative of intensities of the signals generated at step (ii) for all the isotopes of a predetermined species $A_aO_o$, where element A is present in both the separated oxidizable compound and reference sample, and summing these intensity values,
  extracting from treatment of the signals generated by the detector device at step (ii) for the reference sample, values representative of intensities of the signals generated at step (ii) for all the isotopes of the predetermined species $A_aO_o$, and summing these intensity values,
  from the known amount of A contained in the reference sample and from the above sums, calculating the amount of A in the oxygen-containing separated oxidizable compound, and calculating the amount of O in the oxygen-containing separated oxidizable compound and/or the amount of the oxygen-containing separated oxidizable compound by means of the chemical formula of the oxygen-containing separated oxidizable compound determined in a previous step.

This embodiment is particularly advantageous when the test sample contains, or consists of, several oxidizable compounds. Of course, the total amount of O in the test sample could be then obtained from the sum of the O content quantified for each individual separated oxidizable compound. The above step (d) may also be used for quantification of oxygen-containing compound(s) of known formula. In this case, a further step for determining the chemical formula is not necessary.

When oxidizable compound(s) of the test sample provided step (a) is(are) organic compounds, the oxidizable reference sample contains, or consists of, at least one reference compound which contains at least C, preferably at least C and H, and optionally N, S or any other chemical element different from O if present in the test sample.

In another embodiment, where the step (c) is performed for all the gaseous oxidized species $A_aO_o$ obtained from complete oxidation step (i) and detected in step (ii), the quantification step (d) may be replaced by a quantification step (d') for determining the quantity of oxygen in the test sample, including, for each gaseous oxidized species $A_aO_o$ for which it has been determined at step (c) that the isotopic ratio value of the test sample, optionally the isotopic ratio value of a separated oxidizable compound, differs from the value of the same isotopic ratio of the reference sample, showing the presence of oxygen originating from the test sample, optionally from the separated oxidizable compound. This implies that element A is present both in the test sample (or separated oxidizable compound) and reference sample. This quantification step (d') includes:

extracting from treatment of the signals generated by the detector device at step (ii) for the test sample, optionally for the separated oxidizable compound, values representative of intensities of the signals generated at step (ii) for all the isotopes of this $A_aO_o$ species, and summing these intensity values, extracting from treatment of the signals generated by the detector device at step (ii) for the reference sample, values representative of intensities of the signals generated at step (ii) for all the isotopes of this $A_aO_o$ species, and summing these intensity values, from the known amount of A contained in the reference sample and from the above sums, calculating the amount of A in said test sample, optionally in the separated oxidizable compound, and then calculating its amount of oxygen using the isotopic ratio $A_a^{16}O/A_a^ZO_i^{16}O_{o-i}$ and the abundances of the isotopic O present in the oxidizing medium This embodiment allows determining the quantity of oxygen of a compound or mixture of compounds without knowing the chemical formula of the compound(s), using preferably a reference sample free of O.

The analytical method according the invention may also allow determining the presence of oxygen in a single or in a mixture of oxidizable compounds, without any previous separation of the compound(s) by a gas or liquid chromatography device.

To this effect, the reference sample preferably does not contain O, and the analytical method may further comprise a step (c') including, for each gaseous oxidized species $A_aO_o$, or for some predetermined gaseous oxidized species $A_aO_o$, obtained from complete oxidation step (i):

extracting test values from treatment of the signals generated by the detector device at step (ii) for the test sample, said test values being the values of each isotopic ratio $A_a^{16}O/A_a^ZO_i^{16}O_{o-i}$ where indicia i is as previously defined, extracting reference values from treatment of the signals generated by the detector device at step (ii) for the reference sample, said reference values being the values of each isotopic ratio $A_a^{16}O/A_a^ZO_i^{16}O_{o-i}$ for which a test value has been determined, determining if the test sample contains oxygen by checking if at least one of the test values differs from the corresponding reference value.

The analytical method according the invention may also allow determining the quantity of oxygen in a single or in a mixture of oxidizable compounds, without any previous separation of the compound(s) by a gas or liquid chromatography device, and optionally without knowing the chemical formula of the compound(s).

To this effect, the method may further comprise:

in step (a), the reference sample contains, or consists of, at least one reference compound in a known amount and the at least one reference compound contains at least one chemical element different from O present in said at least one oxidizable compound contained in, or consisting, the test sample, step (c') is performed for all the gaseous oxidized species $A_aO_o$ obtained from complete oxidation step (i) and detected in step (ii), a further step (d') for determining the quantity of oxygen in the test sample, including the same steps as step (d') described above. This step (d') is performed for each gaseous oxidized species $A_aO_o$ for which it has been determined at step (c') that the isotopic ratio value of the test sample differs from the value of the same isotopic ratio of the reference sample, showing the presence of oxygen originating from the test sample.

As above, when oxidizable compound(s) of the test sample provided step (a) is(are) organic compounds, the oxidizable reference sample contains, or consists of, at least one reference compound which contains at least C, preferably at least C and H, and optionally N, S or any other chemical element different from O if present in the test sample.

The analytical method according to the invention may also allow quantifying one or several oxidizable compound containing oxygen, or their oxygen content, or quantifying oxygen in a test sample for which presence of O is unknown.

To this effect, the analytical method may comprise:

in step (a) the test sample contains, or consists of, at least one oxidizable compound containing oxygen and the reference sample contains, or consists of, at least one reference compound in a known amount and the at least one reference compound contains any chemical element present in said at least one oxidizable compound containing oxygen contained in, or consisting, the test sample, optionally, in step (b), prior to step (i), the test sample, optionally mixed with the reference sample, is introduced into a liquid or gas chromatography device to separate oxidizable compounds having different retention times, which are then submitted separately to steps (i) and (ii), and wherein the analytical method further comprises, optionally for each separated oxidizable compound:

a quantification step (e) comprising:

extracting from treatment of the signals generated by the detector device at step (ii) for the test sample, optionally for the separated oxidizable compound, values representative of intensities of the signals generated at step (ii) for all the isotopes of the oxidized species $A_aO_o$ of a predetermined chemical element A or O, where element A or O is present in both reference sample and the test sample, optionally in the separated oxidizable compound, and summing these intensity values, extracting from treatment of the signals generated by the detector device at step (ii) for the reference sample, values representative of intensities of the signals generated at step (ii) for all the isotopes of oxidized species $A_aO_o$ of same element A or O, and summing these intensity values, from the amount of A or O contained in the reference sample and from the above sums, calculating the amount of A or O in the test sample, optionally in the separated oxidizable compound.

Preferably, quantification step (e) is performed for a predetermined chemical element A. In such a case, the reference sample should preferably not contain oxygen.

When the amount of A in a separated oxidizable compound has been determined, the amount of O may be determined by means of the chemical formula of the separated oxidizable compound determined in a previous step.

Although step (e) can be implemented using O and a O-containing reference compound, which may allow direct quantification of O in a sample, without previously knowing if O is present, this embodiment is not preferred as calculations may be complicated.

The above calculations of A and O may use the abundance of oxygen isotope in the oxidizing medium.

Such embodiment may also be useful for direct quantification of oxygen containing compound, in particular of known chemical formula.

The analytical method according the invention allows a relatively high precision and accurate determination of presence and/or quantity of oxygen in oxidizable compound(s), even at low content of oxygen. Moreover, the method can be implemented by a device easy to use for in-line measurements.

Coupled with qualitative analysis of the oxidizable compounds, the method provides a complete analysis of one or several oxidizable compounds, in particular organic compounds.

The analytical method according to the invention can be used in many different fields where presence of oxygen and its quantification is needed with precision and accuracy, either for laboratory assays or in industrial plants, in particular for in-line measurement. Thus, the analytical method may be used for controlling the quality of products, for controlling chemical processes, for optimizing chemical reactions, in optimization studies.

The analytical method would be particularly useful in the field of refinery, to control the oxygen content of streams so as to avoid formation of undesired compounds in downstream equipment or to avoid de-activation of oxygen sensible catalysts situated downstream. The method would also permit a better understanding of the streams circulating in a refinery.

The present invention is not limited to a particular application; the analytical method may also be used in any industry where the oxygen content in a particular sample is demanded.

The invention also concerns a method for operating an industrial unit comprising at least one operation step in which the presence of oxygen and/or the content of oxygen in one or several fluids circulating into the industrial unit is determined by means of the analytical method according to the invention, said operation being chosen among the management, control, monitoring, startup, shutdown, adjustment and tuning of the industrial unit.

The fluid(s) can be a feedstock or an effluent of the industrial unit, for example a mixture of hydrocarbonaceous organic compounds of vegetal, animal or fossil origin.

The industrial unit may be part of a chemical or petrochemical plant.

By way of example, the industrial unit may be chosen from (1) a fixed bed catalytic cracker or a fluid catalytic cracker, (2) a steam cracker, (3) a hydrogenating unit preferably working under pressure for example for hydrogenation of olefins or alkynes, sulfur removal (HDS), oxygen removal (HDO) and/or nitrogen removal (HDN), (4) a hydrocracker, (5) a steam methane reformer, (6) a unit converting alcohols into olefins such as Methanol To Olefins (MTO) unit and MTO/OCP, (7) an isomerisation unit, (8) a visbreaker, (9) an alkylation unit, (10) a bitumen blowing unit, (11) a distillation tower such as atmospheric or vacuum towers, (12) a sulfur recovery unit, (13) an amine washing unit, (14) a hydrocarbon deep conversion unit such as H-Oil, ARDS, coker, slurry hydrocracker, (15) a polymerization unit such as those using ethylene, propylene, styrene, or butadiene monomer and their mixtures, and eventually with at least one other additional monomer, (16) a syngas producing unit, (17) a syngas fed unit such as a Fischer-Tropsch unit.

DETAILED DESCRIPTION OF THE INVENTION

As regards the oxidizable compound(s) contained in, or consisting, the test sample provided in step (a) to which the analytical method according the invention can be applied, they can be chosen among any oxidizable compound or mixture of oxidizable compounds.

Advantageously, a part or all of the oxidizable compound(s) in the test sample is (are) organic compound(s). Such organic compound(s) comprise a carbon skeletal and a various number of H atoms.

The test sample that can be analyzed can also contain chemical elements other than oxygen, such as N, S, but also one or more other chemical element such as, As, Se, Pb.

In particular, complex mixtures of oxidizable compound(s) and in particular of organic compounds can be analyzed using the present method, such as mixtures of hydrocarbonaceous organic compounds of vegetal, animal or fossil origin.

In any embodiment, the test sample may be chosen among (1) synthetic crude or fractions thereof; (2) crude petroleum or fractions thereof; (3) refinery off-gas; (4) LPG; (5) monomer containing material such as ethylene, propylene, butene isomers, pentene isomers, hexene isomers, their mixtures, and their mixtures with their corresponding alkanes; (6) pyrolysis gas; (7) naphtha; gasoline; (8) jet-fuel; (9) avgas; (10) diesel fuel; (11) bunker fuel; (12) bunker fuel; (13) bitumen; (14) petroleum residue such as light cycle oil, heavy cycle oil, atmospheric residue, vacuum residue, visbroken residue, slurry residue, pet-coke; (15) optionally hydrogenated oil or wax directly issued from animal, vegetal or algal biomass or waste.

In particular, hydrocarbon feedstocks used in refinery or effluents issued from a refinery can be analyzed by the present method. Hydrocarbon feedstocks can be crude oils, oils derived from tars, oils derived from bituminous sands, oils derived from coal, feedstocks used as feed of vapocracking units, feedstocks used as feed of cracking unit, in particular, feed originated from biomass, feedstocks used as feed for polymerisation units, feedstocks used in units for dehydrating alcohols. Effluents can be effluent from fluid catalytic cracking units, from vapocracking units.

The test sample may also contain, or consists of, oxygen-containing compound(s), in particular of known chemical formulas, that need to be quantified.

As regards the reference sample provided in step (a), this reference sample contains, or consists of, at least one oxidizable reference compound which contains at least one chemical element present in the test sample.

Advantageously, this at least one chemical element is contained in major amounts in the test sample, that is the content of this chemical element is the more important compared to a content of any other chemical element in the test sample.

Optionally, the reference sample may contain all the chemical elements present in the test sample.

By definition, the chemical formula of each reference compound contained in the reference sample is known.

Each reference compound is also oxidizable into $A_aO_o$ species.

Advantageously, the reference sample contains a single reference compound.

Advantageously, in particular when all or part of the test sample is organic compound(s), the reference compound may contain at least C, preferably at least C and H, and optionally N, S or any other chemical element, in particular a chemical element also present in the test sample.

In particular, the at least one reference compound may also contain N, S or any other chemical element such as, As, Se, Pb. In particular, reference compounds containing N, S or another chemical element are used if oxidizable compound(s) contained in the test sample contain(s) these chemical elements. This may allow quantification of the oxidizable compound containing the test sample by quantification of these elements N, S or others.

The at least one reference compound may also contain oxygen.

More generally, when the oxidizable compound(s) of the test sample contain(s) at least one chemical element different from oxygen, such as for example S, N, C, P, As, Se, Pb, V, Si, Ni, Mo, the content of one or several of these chemical elements can be determined using the known isotopic dilution technique.

To this effect, a known amount of one isotope of at least one chemical element other than oxygen is mixed to the oxidizable compound(s) before step (i). This isotope, used as a marker and added for example in the form of a carbonaceous compound, forms gaseous oxidized species in step (i) which are the same to those obtained with the sample to analyze.

The isotope can also be mixed with the gaseous oxidized species issued from the sample to analyze before step (ii). In that case, it is preferably added in the form of the same gaseous oxidized species as those of the sample.

For example, for C, N and S, gaseous oxidized species added or formed are $^{13}CO_2$, $^{15}NO_x$, $^{34}SO_x$.

By measurement of the isotopic ratios with and without the isotope marker, the quantity of the corresponding element can be determined, as disclosed in EP 1 939 617 A1, which is incorporated therein by reference.

In a more general way, the amount of reference sample is known when quantification is required.

The reference sample may be mixed with the test sample before step (i). In other words, the reference compound is then an internal reference. In such a case, introduction of the mixture in a gas or liquid chromatography device prior to step (i) will permit to oxidize separately the test sample and the reference sample, provided their retention time are sufficiently different. An appropriate reference sample having a retention time sufficiently different from the test sample may therefore be chosen by the man skilled in the art. Retention times are considered sufficiently different, when the separated compounds leave the chromatography device completely separated, i.e. when their retention times do not overlap.

The reference sample may also be submitted alone to step (i) before or after the test sample. The reference sample is then an external reference.

As regards the optional step of determination of the nature of the oxidizable compound(s) contained in, or consisting, the test sample. It can be performed previously to any step of the analytical method, to determine the chemical formula of oxidizable compound(s) to quantify.

This step can, for example, be performed using any known qualitative method depending on the nature of the oxidizable compound(s).

In a preferred embodiment, a gas or liquid chromatography device can be used, optionally coupled with a mass spectrometry detector, for example a mass spectrometer with an electronic-impact ionization source.

The invention is however not limited by a particular analyzing method, provided the chemical formula can be determined.

As regards the optional step for volatilizing the sample to analyze, such volatilization can be obtained by any existing means under conditions permitting to volatilize the oxidizable compound(s) tested without decomposition thereof.

Examples of volatilizing means that can be used are heated devices such as split/splitless injectors, PTV (programmed temperature vaporization) injector, but also equipment comprising injectors, such gas chromatography devices.

Advantageously, the volatilizing can be obtained by passing the oxidizable compound(s) to analyze in gas chromatography device.

The gas chromatography device can be any chromatography device available on the market.

Advantageously, if a gas chromatography device is used for volatilization, it can be the same as the one used for qualitative determination of the oxidizable compound(s) in the step of determination of the chemical formula. This permits to attribute a particular retention time to identified oxidizable compound(s).

As regards step (b), the test sample and the reference sample provided in step (a) are submitted separately to a step (i) of complete oxidative reaction in presence of an oxidizing medium containing at least one oxidizing agent under conditions efficient to completely oxidize the sample into gaseous oxidized species $A_aO_o$ and to a step of detection (ii) of these species.

As regards oxidation step (i), the reference sample and the test sample are converted into the same species $A_aO_o$ (for organic compounds, these species are for example $CO_2$, $H_2O$, $SO_x$, $NO_x$, . . . ).

The oxidizing medium of step (i) contains a predetermined content of an oxygen isotope $^ZO$ that is not the same as natural composition and distribution of oxygen isotopes. This means that the $^ZO$ isotope used is not the isotope found naturally in the nature, In other words, Z≠16, for example Z=18 or 17, preferably Z=18. Moreover, the oxidizing medium contains this $^ZO$ isotope in an amount which is different from the natural amount of $^ZO$ in the nature (0.2%). As this $^ZO$ isotope will be incorporated into the oxidized species, it can be used as an oxygen marker for analysis purpose. The invention is not limited by a particular $^ZO$ content in the oxidizing medium, provided such content is sufficiently different from natural abundance to be detected by the used detecting device.

Thus, the oxidizing medium has an isotopic ratio $^ZO/^{16}O$ different from the natural oxygen isotopic ratio.

By way of example, an isotopic ratio $^ZO/^{16}O$ may be considered as different from a natural isotopic ratio when said ratio $^ZO/^{16}O$ differs from the natural isotopic ratio $^ZO/^{16}O$ by at least 10 times, preferably by at least 25 times, most preferably by at least 50 times and in particular by at least 250 times. Of course, the higher the difference, the easier to identify the presence of natural O in the test sample.

Whatever the embodiment concerned, the oxygen isotope $^ZO$ present in the oxidizing medium may be chosen among $^{18}O$, $^{17}O$ and their mixture. The oxidizing medium used in step (b) may contain only $^{18}O$.

Whatever the embodiment concerned, the oxidizing medium contains at least one oxidizing agent that may be chosen from (1) an oxygen-containing gas, such as $^{18}O_2$, (2) a metal oxide, said metal being optionally chosen among Cu and/or Ni, or others.

The oxidizing agent can be an oxygen-containing gas, for example chosen among dioxygen ($O_2$) and mixtures of dioxygen with inert gases such as argon (Ar), helium (He), etc. Preferably, $^{18}O_2$ is used as oxygen-containing gas in step (b)

Preferably, the content of $^ZO$ in the oxygen-containing gas is chosen such that said ratio $^ZO/^{16}O$ differs from the natural isotopic ratio $^ZO/^{16}O$ by at least 10 times, preferably by at least 25 times, most preferably by at least 50 times and in particular by at least 250 times.

The oxidative reaction is performed under conditions efficient to completely oxidize the test sample and the reference sample into gaseous oxidized species $A_aO_o$. These conditions can be easily determined by the man skilled in the art depending on the oxidizable compound(s) provided in step (a).

Preferably, an excess of oxygen is provided for performing a complete oxidative reaction.

By way of example, a temperature above 800° C., preferably at least 850° C. can be applied. The temperature applied is preferably below 1200° C., more preferably below 1150° C.

The invention is not limited by a particular temperature, provided complete oxidation of the test sample and reference sample is obtained. In particular, other ranges of temperatures may be used depending on the size of the apparatus used and on the materials of the apparatus used.

The oxidative reaction can be performed in presence of one or several catalysts promoting the oxidative reaction. Catalyst can for example be chosen among metals, metallic oxides or their mixtures. Metallic oxides such as CuO, AgO, or any other appropriate metallic oxide can be used.

By way of example, the reaction can be performed in presence of Cu and/or Ni and Pt (or Pd) wires. In such a case, the metal may eventually be oxidized by an oxygen-containing gas used in step (b) prior to, or during, the oxidative reaction of the oxidizable compound(s). Pt (or Pd), used as catalyst, may promote the transfer of oxygen from Cu to the oxidizable compound(s) during oxidation reaction.

Accordingly, an oxidizing agent of the oxidizing medium can be a metal oxide, where the metal is for example chosen among Cu, Ni. Such oxidizing agent, containing the $^ZO$ isotope of oxygen, can be used alone or in combination with the above described gaseous oxidizing agent, optionally in presence of a catalyst.

By complete oxidative reaction of the oxidizable compound(s) formed in step (i), gaseous oxidized species are formed, some of which containing the oxygen isotope $^ZO$ present in the oxidizing medium used in step (i). In other words, gaseous oxidized species containing different isotopes of oxygen are obtained. In particular, gaseous oxidized species formed contain isotope $^{16}O$ originating from the oxidizable compound(s) if any, isotope $^ZO$ originating from the oxidizing medium, and eventually isotope $^{16}O$ originating from the oxidizing medium.

By way of example, the complete oxidative reaction (complete combustion) of oxidizable organic compound(s) performed in step (i) can be represented by equations (1) and (2) below, assuming for clarity that the isotope $^ZO$ is $^{18}O$ and that natural O is pure $^{16}O$ (99.8% abundance):

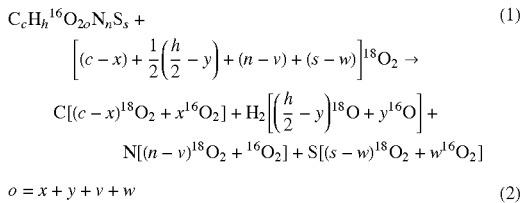

$$C_cH_h{}^{16}O_{2o}N_nS_s + \left[(c-x) + \frac{1}{2}\left(\frac{h}{2}-y\right) + (n-v) + (s-w)\right]^{18}O_2 \rightarrow \quad (1)$$

$$C[(c-x)^{18}O_2 + x^{16}O_2] + H_2\left[\left(\frac{h}{2}-y\right)^{18}O + y^{16}O\right] +$$

$$N[(n-v)^{18}O_2 + {}^{16}O_2] + S[(s-w)^{18}O_2 + w^{16}O_2]$$

$$o = x + y + v + w \quad (2)$$

where:
indicia c, h, o, s, n represent respectively the number of atoms of C, H, O, S, N in the organic compound(s) studied,
x represents the fraction of oxygen atoms present in the organic compound that will result in $CO_2$ after oxidation,
y represents the fraction of oxygen atoms present in the organic compound that will result in $H_2O$ after oxidation,
v represents the fraction of oxygen atoms present in the organic compound that will result in $NO_2$ after oxidation,
w represents the fraction of oxygen atoms present in the organic compound that will result in $SO_2$ after oxidation,
the sum of x, y, v and w corresponds to the number of oxygen atoms present in the organic compound to be oxidized.

From the oxidative reaction equation (1), it can be seen that $A_aO_o$ species that can be detected are oxidized species such as $CO_2$, $H_2O$, and where N and S are present, $NO_x$, $SO_x$, especially $NO_2$ and $SO_2$.

When a separation is performed using a gas or liquid chromatography device, the oxidizable compound(s) having sufficiently different retention times can be separated. This will permit to determine in a further step (c) the presence of oxygen content or in a further step (d) the content of oxygen in oxidizable compound(s) having a specific retention time.

As regards step (ii), gaseous oxidized species containing different isotopes of oxygen are detected and a signal characteristic of each detected species and representative of the quantity of this detected species is generated by the detector device.

Thus, we can detect the oxidized species $A_aO_o$ formed in step (i) such as $CO_2$, $H_2O$, and where N and S are present, $NO_x$, $SO_x$, especially $NO_2$ and $SO_2$, each of these species potentially containing $^ZO$ originated from the oxidizing medium used in step (c) and potentially $^{16}O$ originated from the test sample, and eventually $^{16}O$ originated from the oxidizing medium used in step (i), when such medium does not contain $^ZO$ exclusively The signal generated by the detecting device can be an analogical or numerical signal.

The signals generated by the detection device can be submitted to usual signal treatment known by the man skilled in the art, so as to extract for example a value representative of the intensity of a signal, or a value representative of an isotopic ratio for an oxidized species.

By way of example, a signal treatment may allow plotting a spectrogram, in which a peak is characteristic of a single species $A_aO_o$ of a particular oxygen isotope, the area or height of the peak being representative of the quantity of this single species. The area and the height of the peak are related to the intensity of the signal. Such peak can therefore be used to determine the value representative of the intensity of the signal or the isotopic ratios.

Whatever the embodiment concerned, the detector device can be (1) a mass spectrometer wherein the ionization source of the mass spectrometer can be for example an electronic ionization, (2) an infra-red spectrometer equipped for example with a cavity Ring Down device, or (3) any other appropriated device suitable for isotope speciation.

The mass spectrometer can be the same as the one used for qualitative determination of the oxidizable compound(s) if required.

In particular, when the detection device is a mass spectrometer, a mass spectrogram obtained by usual signal treatment can be plotted.

All of the gaseous oxidized species formed in step (i) may be detected and their signals generated.

When the oxidizable compound(s) contain(s) oxygen and at least one chemical element different from oxygen, such as for example C, H, S, N, C, As, Se, Pb, gaseous oxidized species containing these elements are formed in step (i). Therefore, if isotopes of these elements are introduced as explained above, gaseous oxidized species containing these elements and their isotopes can be detected and their signal can be generated.

We may also chose to detect and generate signals for some predetermined oxidized species formed in step (i), depending on the analysis to perform.

As regards step (c) or (c') for detecting the presence of oxygen in the test sample, it can be determined from the signals representative of all or some gaseous oxidized species of each oxygen isotope and from reference signal(s). The reference signal(s) is generated by submitting a reference sample provided in step (a) to step (b) under the same conditions as the test sample to analyze. For this determination, the reference sample should preferably be free of oxygen.

When the test sample, optionally mixed with the reference sample, is introduced into a gas or liquid chromatography device in step (b) prior to steps (i), (ii), presence of oxygen into separated oxidizable compound(s) in the test sample may then be performed in a step (c) as follows.

For each gaseous oxidized species $A_aO_o$, or for some predetermined gaseous oxidized species $A_aO_o$, the signals generated by the detection device for the separated oxidizable compounds and the reference sample are treated separately to extract, for each separated oxidizable compound and for the reference sample, at least the values of isotopic ratios $A_a{}^{16}O/A_a{}^ZO_i{}^{16}O_{o-i}$, where indicia i is as previously defined. The following values are determined for each gaseous oxidized species $A_aO_o$, or for some predetermined gaseous oxidized species $A_aO_o$:
test values (V_test_compound) for the isotopic ratios of the separated oxidizable compounds of the test sample,
reference values (V_ref) for the isotopic ratios of the reference sample.

The presence of oxygen can then be easily determined in a separated oxidizable compound by comparison of the values (V_test_compound) and the values (V_ref) for each oxidized species $A_aO_o$. Indeed, as the reference sample does not contain oxygen, if, for all the species $A_aO_o$, the above values are equal, it means that the separated oxidizable compound does not contain oxygen. On the contrary, if one or more values (V_test_compound) and (V_ref) are different, it means that the separated oxidizable compound contains oxygen.

As previously mentioned, a difference can be considered sufficiently significant of the presence of oxygen if the values differ of more than a statistical difference usually observed for several analysis of the sample. By way of example, oxygen can be considered as present if the isotopic ratios differ of more than 3%, preferably of more than 4%, most preferably of more than 5%.

Determination (or detection) of the presence of oxygen can also be obtained similarly without separation of the oxidizable compound by a gas or liquid chromatography device. Presence of oxygen in the test sample may then be performed in a step (c') as follows.

For each gaseous oxidized species $A_aO_o$, or for some predetermined gaseous oxidized species $A_aO_o$, the signals generated by the detection device for the test sample and the reference sample are treated separately to extract, for the test sample and for the reference sample, the values of isotopic ratios $A_a{}^{16}O/A_a{}^ZO_i{}^{16}O_{o-i}$. The following values are determined for each gaseous oxidized species $A_aO_o$, or for some predetermined gaseous oxidized species $A_aO_o$:

- test values (V_test) for the isotopic ratios of the test sample,
- reference values (V_ref) for the isotopic ratios of the reference sample.

As above, the presence of oxygen in the test sample can be easily determined by comparison of the values (V_test) and the values (V_ref) for each oxidized species $A_aO_o$. If the values (V_test) and (V_ref) are equal for all the $A_aO_o$ species, it means that the test sample does not contain oxygen, if the values (V_test) and (V_ref) are different for at least one $A_aO_o$ species, it means that the test sample contains oxygen.

In both embodiments, if it is observed that $^{16}O$ originating from a particular oxidizable compound or for a particular kind of test sample, is always found in a particular oxidized species $A_aO_o$, only the signals generated for this species may be detected and treated for comparison of isotopic ratio values. This may permit to reduce the analysis time.

As regards quantification step (d) or (d'), for determining the quantity of oxygen in the test sample, or the quantity of an oxidizable compound of the test sample, it also comprises the treatment of the signals representative of all or some gaseous oxidized species of each oxygen isotope and from reference signal(s), generated by submitting the reference sample provided in step (a) to step (b) under the same conditions as the test sample to analyze.

As quantification is the aim of these steps (d) or (d'), the amount of reference sample has to be known, and if the reference sample contains several reference oxidizable compounds, the amount of each of them has to be known.

Quantification may be performed knowing the chemical formula of the oxidizable compound (step d) or not (step d').

When the test sample, optionally mixed with the reference sample, is introduced into a gas or liquid chromatography device to separate oxidizable compounds and subsequently these separated oxidizable compounds are submitted to step (b), quantification of oxygen in a separated oxidizable compound or quantification of a separated oxidizable compound in the test sample may then be performed in a step (d). This quantification may advantageously be performed for separated oxidizable compound for which it has been determined in the previous step (c) that it contains oxygen. This embodiment requires knowing the chemical formula of the separated oxidizable compound analyzed. Such chemical formula can be determined in a previous step, as described above.

Step (d) is then performed for each separated oxidizable compound. The quantification is here performed by quantifying first a chemical element A other than oxygen that is present in both separated oxidizable compound and reference sample. This chemical element is preferably C for organic compounds as the $CO_2$ often generates an intense signal, but may also be N or S, or any other chemical element present in both test and reference samples. For compounds free of C, the chemical element A chosen may be a chemical element which is known to be the major element in the compound. Step (d) is described below using C as quantified element, but can be generalized to any A element by replacing C by A in the following notations.

For each gaseous oxidized species $A_aO_o$, or for some predetermined gaseous oxidized species $A_aO_o$, the signals generated by the detection device for the separated oxidizable compound and the reference sample are treated separately to extract, for each separated oxidizable compound and for the reference sample, values representative of the intensities of the signals generated for all the isotopes of $CO_2$. The following values are determined:

- the value $I(CO_2)$ compound which is the sum of the intensities of all the $CO_2$ signals generated for the separated oxidizable compound,
- the value $I(CO_2)$ sample which is the sum of the intensities of all the $CO_2$ signals generated for the reference sample,
- the C content in the reference sample from the amount of reference sample.

The C content of the separated oxidizable compound can then be easily determined from the above values, and subsequently the amount of O, or the amount of separated oxidizable compound from its chemical formula. See example 2 for more details.

The chemical formula of the oxidizable compounds may also not be known. In such a case, we may perform quantification as described below.

In this case, the test sample, optionally mixed with the reference sample, may or not be introduced into a liquid or gas chromatography for separation before step (i).

Step (c) or (c') described above are performed for all the gaseous oxidized species $A_aO_o$ obtained from complete oxidation step (i) and detected in step (ii). This step (c) or (c') has thus permitted to determine for which species $A_aO_o$ the isotopic ratio differs in the reference sample and in the test sample (or in a separated oxidizable compound).

Then, in step (d'), for the above mentioned species $A_aO_o$, an appropriate treatment of the signals allows determining:

- the value $I(A_aO_o)$ test which is the sum of the intensities of all the $A_aO_o$ signals generated for the test sample, or the value $I(A_aO_o)$ compound which is the sum of the intensities of all the $A_aO_o$ signals generated for the separated oxidizable compound,
- the value $I(A_aO_o)$ sample which is the sum of the intensities of all the $A_aO_o$ signals generated for the reference sample.

The amount of A in the reference sample being known, it is possible to determine the amount of A in the test sample (or in the separated oxidizable compound), and to determine the amount of O using the isotopic ratio $Aa^{16}O/Aa^ZO_i{}^{16}O_{o-i}$ and the abundances of the isotopic O present in the oxidizing medium.

If it is observed that $^{16}O$ originating from a particular oxidizable compound or for a particular kind of test sample, is always found in a particular oxidized species $A_aO_o$, only the signals generated for this species may be detected and treated as disclosed above. This may permit to reduce the analysis time. Otherwise, the intensities of the signals generated for all the species $A_aO_o$ having isotopic ratio different from the reference sample are to be summed.

Although not preferred, it should be noted that quantification of O may also be performed using a reference sample containing O in a known amount. The oxygen containing reference compound can for example be an ester. In such a case, the determination may however be more complicated, as intensities of the signal of all the oxidized species should be summed for the separated organic compound on one hand and for the reference sample on the other hand.

As regards quantification in a test sample, which may contain only oxygenated oxidizable compounds or which may not contain oxygen, the analytical method according the invention may also allow quantification of such test sample.

The reference sample is in known amount as for above quantification steps (d) or (d'), and may also contain oxygen.

Optionally, in step (b), prior to step (i), the test sample, optionally mixed with the reference sample, is introduced into a liquid or gas chromatography device to separate oxidizable compounds having different retention times, which are then submitted separately to steps (i) and (ii).

The quantification may then be performed as disclosed below in a step (e) similar to above described steps (d) or (d') but wherein we sum intensities of the signals for all the isotopes of the oxidized species $A_aO_o$ of a predetermined chemical element A or O, where element A is present in both the test sample and reference sample. From these sums obtained for the test sample (or a separated oxidizable compound) and for the reference sample, and knowing the amount of A or O, we can determine the amount of A or O in the test sample, optionally the separated oxidizable compound.

Other objects, advantages and characteristics of the invention will emerge partly from the description. The following examples and drawing are provided for illustrative purposes and are not intended to limit this invention.

BRIEF DESCRIPTION OF THE FIGURES

FIG. 1 shows an example of analytical device 10 that can be used for implementing the analytical method of the present invention.

Figure 1:
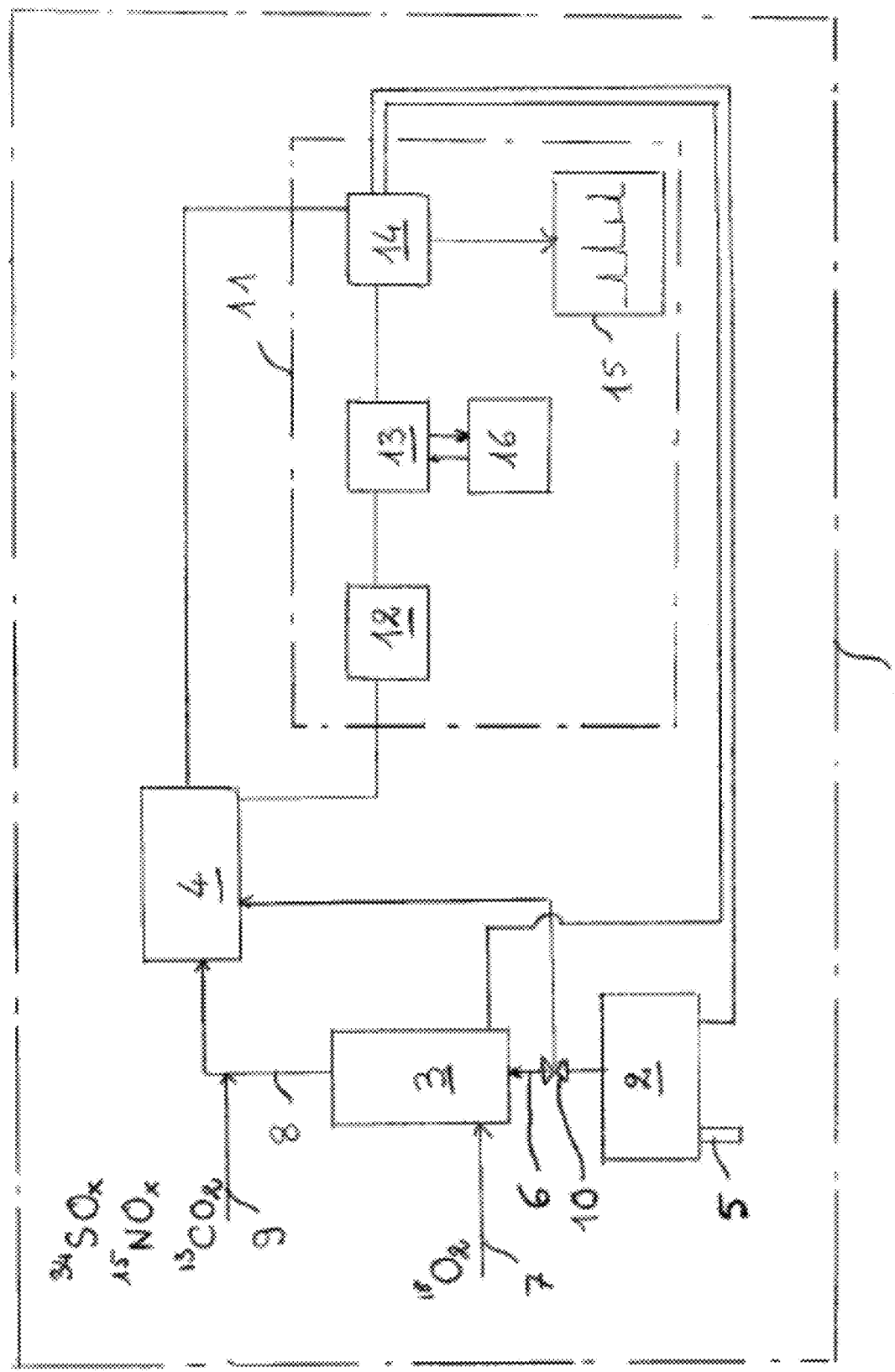
FIG. 1 represents an example of analytical device for performing the method according to the invention.

The analytical device 1 comprises a gas chromatography device 2, a combustion unit 3 and a detector device 4.

The sample to analyze (test sample) is injected into the gas chromatography device 2 using an injector 5, for example an injection port that is part of the gas chromatography device 2. The injector 5 volatilizes the test sample which then passes through a separation column of the gas chromatography device 2.

When the sample contains different oxidizable compounds, volatilized oxidizable compounds with different retention times leave the gas chromatography device 2 separately.

The volatilized oxidizable compounds leaving the gas chromatography device 2 are conducted through a line 6, for example a fused silica capillary, to the combustion unit 3. Therefore, the volatilized oxidizable compounds having different retention times pass through the combustion unit 3 separately.

The combustion 3 unit is for example an oven which is dimensioned to permit a complete oxidative reaction of the volatilized oxidizable compounds while avoiding remix of the volatized oxidizable compounds of different retention times. Thus, the order of the retention times of oxidizable compounds passing through the combustion unit 3 is not modified.

By way of example, the combustion unit 3 can comprise a ceramic tube having an external diameter of 3 mm, an inside diameter of 0.5 mm and a length of 35 cm, said ceramic tube being surrounded by a resistance, the whole being placed inside a thermal insulator.

The combustion unit 3 usually comprises a temperature sensor for temperature regulation.

A line 7 permits to provide the combustion unit 3 with an oxygen-containing gas to perform the complete oxidative reaction. According to the invention, the oxygen-containing gas has a predetermined content of an isotope of oxygen $^ZO$. Preferably, $^{18}O_2$ is used as oxygen-containing gas. If the addition of the oxygen-containing gas is produced on-line with the volatilized oxidizable compounds for their combustion, the excess of oxygen-containing gas should be removed before reaching the detector device 4.

To promote the oxidative reaction, the combustion unit 3 can contain a catalyst, for example Cu and Pt wires or wires of any other appropriate metals or alloys thereof and under any appropriate shape (wires, mesh, nano-particles . . . ). Previously to the oxidative reaction or during the reaction, the Cu wires are oxidized into CuO by the oxygen-containing gas. The oxygen isotope $^ZO$ is therefore present in CuO. Eventually, in any embodiment, the oxidative reaction can be performed only in presence of the metallic oxide containing the oxygen isotope $^ZO$, without the above mentioned oxygen-containing gas.

In the combustion unit 3, the volatilized oxidizable compounds are completely oxidized. By way of example, an oxidizable organic compound $C_cH_h$ or an oxidizable organic compound $C_cH_hO_o$ will form $cCO_2$ and $h/2H_2O$, a $C_cH_hN_n$ compound will form $cCO_2$, $nNO_x$ and $h/2H_2O$, and a $C_cH_hS_s$ compound will form $cCO_2$, $sSO_x$ and $h/2H_2O$.

The oxidized species leave the combustion unit 3 and pass to the detector device 4 via a line 8, for example a fused silica capillary.

In general, in any embodiment, the detector device 4 detects the different m/z oxidized species leaving the combustion unit 3 and generates signals, each signal being representative of a m/z oxidized species and depending on the quantity of the detected m/z oxidized specie. This detector device 4 is for example a mass spectrometer or any other device adapted to detect different species and their isotopes, such as a cavity Ring Down spectrometer.

A line 9, connected to line 8, permits to provide known amount of isotopes of chemical elements other than oxygen, when determination of the amount of other chemical element is to be performed by isotopic dilution according to the method disclosed in EP1939617. The isotopes species introduced may for example be $^{13}CO_2$, $^{15}NO_x$, $^{34}SO_x$.

A three-way valve 10 can be provided on line 6 to connect the gas chromatography device 2 directly to the detector device 4, for example for qualitative analysis.

Gas chromatography device 2 may be replaced by a liquid chromatography device.

The detector device 4 can be connected to a determination device 11 for performing the determination step of the analytical method that is any of steps (c), (c'), (d, (d'), (e).

The determination device 11 may comprise:
- reception means 12 to receipt signal(s) generated by the detector device 4,
- processing means 13 that are arranged so as to, upon reception of the signal generated by the detector device, treat the signals, determine intensity values, isotopic ratio values or peak area or peak height values and determine the presence of oxygen, the quantity of oxygen, of oxygenated compound, or of any compound present in the sample, or the quantity or chemical elements other than oxygen,
- transmitting means 14 to transmit to a display unit 15 the signals generated by the detector device and/or the values determined by the processing means 13,
- eventually a memory 16 to store the signals and determined values.

The processing means may also generate a control signal to control the combustion unit 3, and eventually the gas chromatography device 2 and the detector device 4.

This determination device 11 may comprise or be integrated into one or several processors, e.g. microcontrollers, microprocessors, etc.

The reception means may comprise an output pin, an entry port, etc. The processing means may comprise a central processing unit, a processor, etc. The transmitting means may comprise an output pin, an output port, etc.

EXAMPLES

Experimental

Tests were performed on an instrumental device as described in reference with FIG. 1, wherein:
- the gas chromatography device comprises a column DB-5 (30 m length; 0.25 mm Internal Diameter),
- the combustion oven 14 contains Cu and Pt wires,
- the detection device is a mass spectrometer, detecting m/z: 18, 20, 44, 45, 46, 47, 48, 49.

The conditions of operation of the gas chromatography device are reported in table 1, using a split/splitless injector.

The temperature of the combustion oven was set to 850° C.

The oxygen containing gas used in the combustion oven is $^{18}O_2$, with an isotopic content of 97.1% of $^{18}O$ and a 2.1% content of $^{16}O$.

Before combustion, a flow of the above oxygen containing gas is flushed in the oven, whereby the Cu wires are oxidized by $^{18}O$ and $^{16}O$. The abundances in $^{18}O$ (Ab$^{18}O$) and $^{16}O$ (Ab $^{16}O$) finally retained in the Cu filaments can be determined by mass spectrometry. We obtained this time: Ab $^{16}O$=20.3% and Ab$^{18}O$=78.1. However, it should be noted that these values could be slightly different depending in the conditions used during the flushing of the oxygen containing gas into the oven.

The combustion is then performed without flushing with the oxygen containing gas.

TABLE 1

| conditions of the gas chromatography (GC) device: | |
|---|---|
| GC | Splitless Mode |
| Injector temperature | 250° C. |
| Splitless time | 0.8 min |
| Split ratio | 1:50 |

TABLE 1-continued

| conditions of the gas chromatography (GC) device: | |
|---|---|
| GC | Splitless Mode |
| Injected volume | 1 µL |
| Carrier gas | helium |
| Oven temperature program | 50° C. (1 min) |
| | 15° C. min$^{-1}$ |
| | 250° C. (3 min) |

Sample Analysis

A solution made of a mixture of 4 alkanes and 4 esters in known quantities was analyzed in the conditions mentioned above. The composition of the solution is detailed in table 2.

Figure 2:
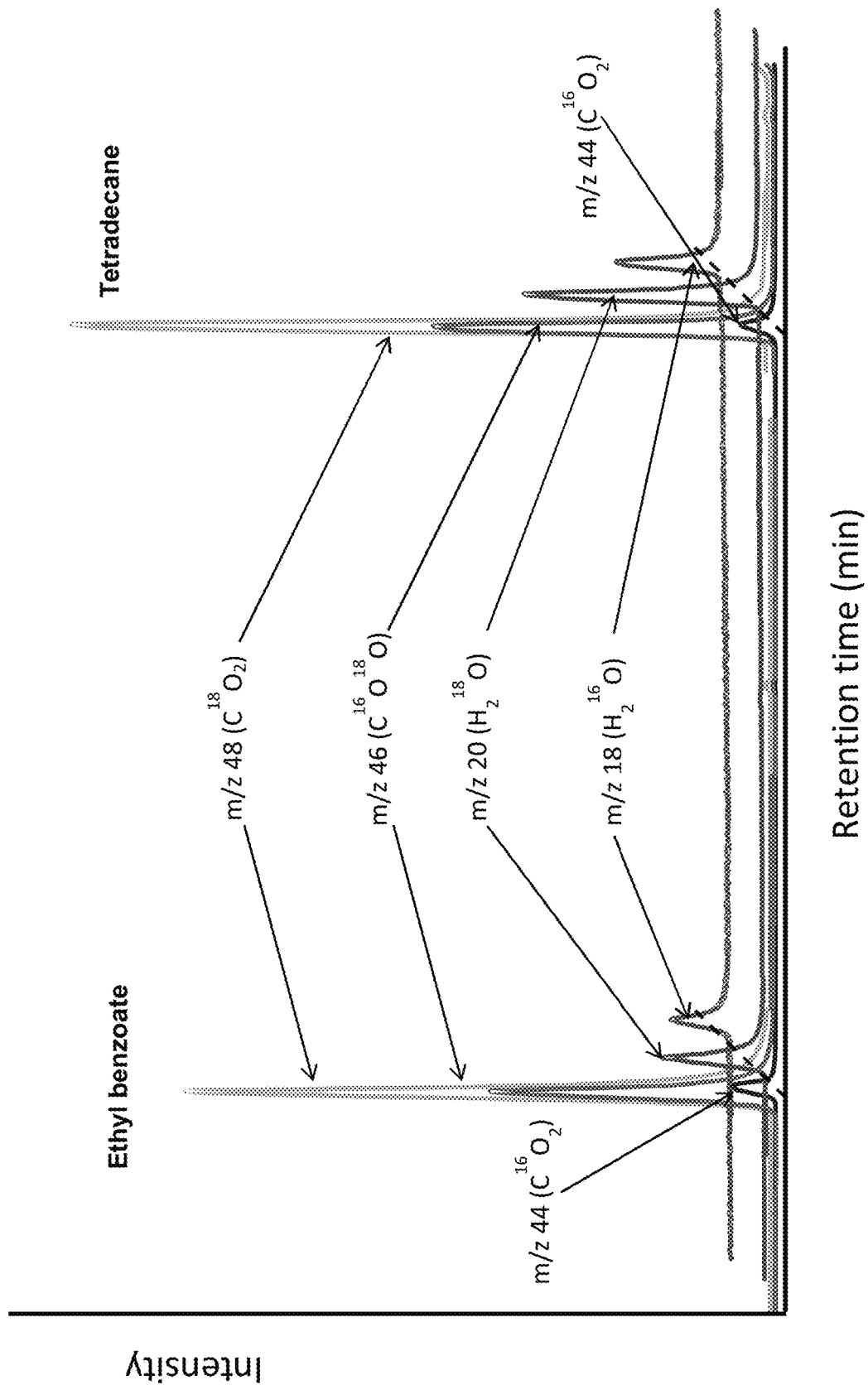
FIG. 2 represents an extract of a mass chromatogram registered for test A in which the intensity of signals corresponding to m/z species of 18, 20, 44, 46 and 48 are represented in function of the retention time.

FIG. 2 represents a part of the mass spectrometry spectra obtained, where only the peaks of tetradecane and ethyl benzoate have been represented for clarity sake. In FIG. 2, peaks corresponding to $H_2O$ have been shifted with respect to $CO_2$ peaks for clarity.

TABLE 2

| composition of the sample in weight ppm | | | | | |
|---|---|---|---|---|---|
| Compound | Formula | ppm compound | ppm C | ppm O | ppm H |
| undecane | $C_{11}H_{24}$ | 59.3 | 50.1 | — | 9.17 |
| ethyl benzoate | $C_9H_{10}O_2$ | 63.2 | 45.5 | 13.5 | 4.24 |
| hexyl butyrate | $C_{10}H_{20}O_2$ | 73.8 | 51.4 | 13.7 | 8.64 |
| phenethyl acetate | $C_{10}H_{12}O_2$ | 75.5 | 55.2 | 14.7 | 5.56 |
| tetradecane | $C_{14}H_{30}$ | 61.2 | 51.8 | — | 9.32 |
| diethyl phthalate | $C_{12}H_{14}O_4$ | 77.3 | 49.7 | 22.1 | 4.86 |
| octadecane | $C_{18}H_{38}$ | 60.2 | 51.1 | — | 9.06 |
| nonadecane | $C_{19}H_{40}$ | 63.3 | 53.8 | — | 9.50 |

Example 1

Determination of Presence of Oxygen

By measurement of peak area ratios, the following isotopic ratios have been determined:

$H_2^{16}O/H_2^{18}O$ corresponding to isotopic ratio 18/20, $C^{16}O_2/C^{18}O_2$ corresponding to isotopic ratio 44/48, $C^{16}O_2/C^{18}O^{16}O$, corresponding to isotopic ratio 44/46, $(H_2^{16}O+C^{16}O_2)/(H_2^{18}O+C^{18}O_2)$ corresponding to isotopic ratio (18+44)/(20+48).

The values obtained are collected in table 3.

It can be noted that isotopic ratios 44/48 and 44/46 are very similar in this sample for the alkanes (tetradecane, octadecane and nonadecane) and the O-containing compounds (phenethyl acetate and ethyl benzoate). In fact differences are below 2%. We notice a difference in isotopic ratios 18/20 and (18+44)/(20+48).

Ratios (18+44)/(20+48) correspond to the ratio of the oxidized species that contain $^{16}O$ exclusively (18 and 44), that comes from the sample and the oxidized medium and $^{18}O$ exclusively (20 and 48), that comes from the oxidized medium as we can neglect the abundance of $^{18}O$ in natural O (0.2%). Therefore, if in a peak observed for a particular retention time, this ratio is different from the ratio obtained for an alkane burnt (internal reference(s) that could be tetradecane, octadecane or nonadecane in this case), this means that the organic compound eluting at this particular retention time contains oxygen.

Table 3 shows that the ratios of phenethyl acetate are always statistically different (at 95% confidence, 2 standard deviations) from the ratios of alkanes.

Similar results are observed for isotopic ratios 18/20, comparison of these ratios also show a difference confirming presence of oxygen in phenethyl acetate.

Similarly, results collected in table 3 confirm the presence of oxygen in ethyl benzoate.

TABLE 3

18/20, 44/48, 44/46 isotopic ratios and (18 + 44)/(20 + 48) isotopic ratios obtained by measurement of peak area ratios

| Compound | (18 + 44)/ (20 + 48) | 44/48 | 44/46 | 18/20 |
|---|---|---|---|---|
| tetradecane | 0.1570 | 0.0610 | 0.1245 | 0.4438 |
| phenethyl acetate | 0.1384 | 0.0611 | 0.1253 | 0.5479 |
| Ethyl benzoate | 0.1469 | 0.0602 | 0.1225 | 0.6341 |
| octadecane | 0.1588 | 0.0613 | 0.1248 | 0.4563 |
| nonadecane | 0.1597 | 0.0618 | 0.1257 | 0.4596 |
| Mean alkanes | 0.1585 | 0.0614 | 0.1250 | 0.4532 |
| SD alkanes | 0.0014 | 0.0004 | 0.0006 | 0.0083 |

Mean alkanes represents the mean value on the ratios determined for the 3 alkanes species and SD alkanes represents its standard deviation.

Example 2

Quantification Using C Quantification and the Chemical Formula of the Test Sample The amount of oxygen can then be determined, for example using an internal or external reference compound, the amount of which is known. It is also possible to determine the amount of the corresponding oxygenated compound using an internal or external reference compound of known amount, containing oxygen or not.

In the present case, the quantity of carbon contained in ethyl benzoate and phenethyl acetate was determined using the $CO_2$ issued from the combustion/oxidative reaction, using one or several alkanes as internal reference. To this effect, we sum the areas of all the isotopic species (detected at different m/z) of $CO_2$ that will contain all the C present.

The signals of $CO_2$ for the reference compound are then used to produce a response factor Rf (area total/mass of C) as we know the C content.

This factor can be applied to the target compound (here ethyl benzoate or phenethyl acetate) to quantify the C present (Compound Independent Calibration, CIC).

Table 4 collects the areas of the $CO_2$ peaks determined for tetradecane, ethyl benzoate and phenethyl acetate.

TABLE 4

Areas of $CO_2$ peaks of ethyl benzoate, phenethyl acetate and tetradecane

| | area peak m = 44 | area peak m = 46 | area peak m = 48 | Total areas |
|---|---|---|---|---|
| tetradecane | 0.4442 | 3.5670 | 7.284 | 11.29 |
| ethyl benzoate | 0.3320 | 2.7104 | 5.5190 | 8.561 |
| phenethyl acetate | 0.4377 | 3.4933 | 7.1669 | 11.10 |

From these value, we can determine for tetradecane:

response factor, $$Rf = \frac{\text{area total}}{\text{ppm } C} = \frac{11.29}{51.8} = 0.218$$

And deducing the C content in phenethyl acetate $$\frac{\text{area total}}{Rf} = \frac{11.10}{0.218} = 50.92 \text{ wt ppm } C.$$

The formula of phenethyl acetate being known ($C_{10}H_{12}O_2$), we can determine the amount of O, here 13.58 wt ppm.

By comparison with the values of table 2, the error of determination of the C and O content of phenethyl acetate is 7.8%.

By similar calculation, we can determine the amount of O in ethyl benzoate with an error of 13.6%.

Example 3

Quantification Without Knowing the Chemical Formula of the Test Sample

This quantification uses the altered O ratios in the species and the absolute amount of the other element present in such species.

In this case, chemical formula is not needed so this approach can be applied to quantify the:
- O present in individual compounds separated by chromatography which identity is not known
- O present in mixtures of compounds (with or without chromatography separation).

In the present case (same test sample as in examples 1 and 2), isotopic ratios 44/48 and 44/46 have also been measured, where m/z=44 corresponds to $C^{16}O_2$, m/z=46 corresponds to $C^{16}O^{18}O$, m/z=44 corresponds to $C^{18}O_2$.

From table 3, it can be observed that isotopic ratios 44/46 and 44/48 are the same for all the molecules, even if the molecule initially contains oxygen. It can therefore be supposed that $^{16}O$ contained in the oxygenated compounds is not recovered in $CO_2$ specie, but rather in $H_2O$ species.

In the present case, O goes only to $H_2O$. A theoretical example of the computation that needs to be made is then presented. We can therefore quantify the H present and use the isotopic ratio in that species (18/20—corrected if necessary) and the abundances of the isotopic O present in the oxidizing medium to quantify the O present.

If we assume that the O(nat) present in the test sample goes to water we will obtain the following for an oxygenated compound of formula $C_cH_hO(nat)_o$:

$c$ moles of $CO_2$(iso), $o$ moles of $H_2O$(nat) and ($h$/2−$o$) moles of $H_2O$(iso).

O(nat) can be considered as pure $^{16}O$ (0.998 abundance) but O(iso) will reflect the abundances of the O (noted Ab $^{16}O$ and Ab$^{18}O$) finally retained in the Cu filaments and will contain both $^{16}O$ and $^{18}O$. Then:

The moles of $H_2^{16}O$ detected at m/z=18 is equal to:

$o+Ab^{16}O\cdot(h/2-o)$

The moles of $H_2^{18}O$ detected at m/z=20 is equal to:

$Ab^{18}O\cdot(h/2-o)$

The Ratio is then:

$$R = \frac{18}{20} = \frac{H_2^{16}O}{H_2^{18}O} = \frac{o + Ab^{16}O \cdot \left(\frac{h}{2} - o\right)}{Ab^{18}O \cdot \left(\frac{h}{2} - o\right)}$$

We can deduce from the above:

$$o = \frac{h}{2} \cdot \frac{R \cdot Ab^{18}O - Ab^{16}O}{1 + R \cdot Ab^{18}O - Ab^{16}O}$$

First we carry out the quantification of H in the target using compound Independent Calibration (CIC) and the reference compound. The area of $H_2O$ peaks are reported in table 5.

TABLE 5

| area of peaks corresponding to m/z = 18 and 20 ($H_2O$ peaks) | | | |
|---|---|---|---|
| compound | Area 18 | Area 20 | Total |
| tetradecane | 1.082 | 2.4386 | 3.5208 |
| ethyl benzoate | 0.6227 | 0.9821 | 1.6048 |
| phenethyl acetate | 0.7412 | 1.3528 | 2.094 |

From the area measured for the reference compound (tetradecane), the response factor Rf is determined:

$$Rf = \frac{\text{area total}}{\text{ppm } H} = \frac{3.5208}{9.32} = 0.378$$

And then, the amount of H in the phenethyl acetate:

$$\frac{\text{area total}}{Rf} = \frac{2.094}{0.378} = 5.54 \text{ ppm } H$$

Using the number of moles of H (h) formed, the ratio 18/20 and the abundances of the isotopic O in the oven, we can determine the O amount: 15.97 ppm O.

By comparison with the values of table 2, the error of determination of the H and O content of phenethyl acetate is 0.3 and 8.5%, respectively.

By similar calculation, we can determine the amount of H and O in ethyl benzoate with an error of 6.8 and 1.4%, respectively.

The invention claimed is:

1. A method for oxygen analysis in an oxidizable compound or in a mixture of oxidizable compounds, said oxidizable compound(s) being organic compound(s), comprising:
   (a) providing a test sample containing at least one oxidizable compound and a reference sample containing at least one oxidizable reference compound which contains at least one chemical element present in the test sample,
   (b) submitting separately the test sample and the reference sample to the following steps under the same conditions:
   (i) a step of complete oxidative reaction, in which the sample is submitted to an oxidizing medium containing at least one oxidizing agent under conditions efficient to completely oxidize the sample into gaseous oxidized species $A_aO_o$, where A is any chemical element different from O present in the sample, a is the number of A atoms, o is the number of O atoms, said oxidizing medium containing a predetermined content of an isotope of oxygen $^ZO$ that is not the same as natural composition and distribution of oxygen isotopes, where z is the mass number of the atom,
   (ii) a step of detection, in which all the gaseous oxidized species $A_aO_o$ formed in step (i) are detected by means of a detector device adapted to detect gaseous oxidized species containing different isotopes of oxygen and to generate, for each detected gaseous species, a signal representative of the quantity of said detected gaseous species, the signals obtained for the test sample and for the reference sample being further treated and compared for at least one action chosen from determination of the presence of oxygen and quantification of oxygen, and prior to step (i), the test sample is introduced into a liquid or gas chromatography device to separate oxidizable compounds having different retention times, which are then submitted separately to steps (i) and (ii).

2. The method according to claim 1, wherein in step (b), the test sample and the reference sample are volatilized prior to be submitted to step (i) by using a gas chromatography device.

3. The method according to claim 1, comprising a further step of determination of the chemical formula of said at least one oxidizable compound contained in the test sample.

4. The method according to claim 3, wherein said step of determination of the chemical formula comprises analyzing said compound(s) using a gas or liquid chromatography device.

5. The method according to claim 1, where the reference sample does not contain oxygen, further comprises a step (c) for each separated oxidizable compounds having different retention times, this step (c) including, for each gaseous oxidized species $A_aO_o$, or for some predetermined gaseous oxidized species $A_aO_o$, obtained from complete oxidation step (i):
   extracting compound test values from treatment of the signals generated by the detector device at step (ii) for said separated oxidizable compound, said compound test values being the values of each isotopic ratio $A_a^{16}O/A_a^ZO_i^{16}O_{o-i}$, where indicia i is an integer taking all the values from zero to o, obtained from the corresponding oxidized species $A_aO_o$,
   extracting reference values from treatment of the signals generated by the detector device at step (ii) for the reference sample, said reference values being the values of each isotopic ratio $A_a^{16}O/A_a^ZO_i^{16}O_{o-i}$ for which a compound test value has been determined,
   determining if the separated oxidizable compound contains oxygen by checking if at least one of its compound test values differs from the corresponding reference value.

6. The method according to claim 5, wherein
   in step a), the reference sample contains at least one reference compound in a known amount and the at least one reference compound contains at least one chemical element different from O present in said at least one oxidizable compound contained in, or consisting, the test sample,
   and wherein, when step (c) has determined that a separated oxidizable compound contains oxygen, the analytical method further comprises, for each separated oxidizable compound containing oxygen:

a quantification step (d) comprising:
extracting from treatment of the signals generated by the detector device at step (ii) for this oxygen-containing separated oxidizable compound, values representative of intensities of the signals generated at step (ii) for all the isotopes of a predetermined species $A_aO_o$, where element A is present in both the separated oxidizable compound and reference sample, and summing these intensity values,
extracting from treatment of the signals generated by the detector device at step (ii) for the reference sample, values representative of intensities of the signals generated at step (ii) for all the isotopes of the predetermined species $A_aO_o$, and summing these intensity values,
from the known amount of A contained in the reference sample and from the above sums, calculating the amount of A in the oxygen-containing separated oxidizable compound, and calculating the amount of O in the oxygen-containing separated oxidizable compound or the amount of the oxygen-containing separated oxidizable compound by means of the chemical formula of the oxygen-containing separated oxidizable compound determined in a previous step.

7. The method according to claim 6, where the reference sample does not contain oxygen and further comprising a step (c') including, for each gaseous oxidized species $A_aO_o$, or for some predetermined gaseous oxidized species $A_aO_o$, obtained from complete oxidation step (i):
extracting test values from treatment of the signals generated by the detector device at step (ii) for the test sample, said test values being the values of each isotopic ratio $A_a^{16}O/A_a^ZO_i^{16}O_{o-i}$ where indicia i is an integer taking all the values from 0 to o,
extracting reference values from treatment of the signals generated by the detector device at step (ii) for the reference sample, said reference values being the values of each isotopic ratio $A_a^{16}O/A_a^ZO_i^{16}O_{o-i}$ for which a test value has been determined,
determining if the test sample contains oxygen by checking if at least one of the test values differs from the corresponding reference value.

8. The method according to claim 5, wherein:
in step (a), the reference sample contains at least one reference compound in a known amount and the at least one reference-compound contains at least one chemical element different from O present in said at least one oxidizable compound contained in, or consisting, the test sample,
step (c) or (c') is performed for all the gaseous oxidized species $A_aO_o$ obtained from complete oxidation step (i) and detected in step (ii),
and wherein the analytical method further comprises:
a step (d') for determining the quantity of oxygen in the test sample, including, for each gaseous oxidized species $A_aO_o$ for which it has been determined at step (c) or (c') that the isotopic ratio value of the test sample, optionally the isotopic ratio value of a separated oxidizable compound, differs from the value of the same isotopic ratio of the reference sample, showing the presence of oxygen originating from the test sample, optionally from the separated oxidizable compound:
extracting from treatment of the signals generated by the detector device at step (ii) for the test sample, optionally for the separated oxidizable compound, values representative of intensities of the signals generated at step (ii) for all the isotopes of this $A_aO_o$ species, and summing these intensity values,
extracting from treatment of the signals generated by the detector device at step (ii) for the reference sample, values representative of intensities of the signals generated at step (ii) for all the isotopes of this $A_aO_o$ species, and summing these intensity values,
from the known amount of A contained in the reference sample and from the above sums, calculating the amount of A in said test sample, optionally in the separated oxidizable compound, and then calculating its amount of oxygen using the isotopic ratio $A_a^{16}O/A_a^ZO_i^{16}O_{o-i}$ and the abundances of the isotopic O present in the oxidizing medium.

9. The method according to claim 1, wherein:
in step (a) the reference sample contains at least one reference compound in a known amount and the at least one reference compound contains any chemical element present in said at least one oxidizable compound contained in, or consisting, the test sample,
and wherein the analytical method further comprises, optionally for each separated oxidizable compound:
a quantification step (e) comprising:
extracting from treatment of the signals generated by the detector device at step (ii) for the test sample, optionally for the separated oxidizable compound, values representative of intensities of the signals generated at step (ii) for all the isotopes of the oxidized species $A_aO_o$ of a predetermined chemical element A or O, where element A or O is present in both the reference sample and the test sample, optionally the separated oxidizable compound, and summing these intensity values,
extracting from treatment of the signals generated by the detector device at step (ii) for the reference sample, values representative of intensities of the signals generated at step (ii) for all the isotopes of oxidized species $A_aO_o$ of same element A or O, and summing these intensity values,
from the amount of A or O contained in the reference sample and from the above sums, calculating the amount of A or O in the test sample, optionally in the separated oxidizable compound.

10. The method according to claim 1, wherein the oxygen isotope $^ZO$ present in the oxidizing medium is chosen among $^{18}O$, $^{17}O$ and their mixture.

11. The method according to claim 1, wherein at least one oxidizing agent in the oxidizing medium is chosen from (1) an oxygen-containing gas, and (2) a metal oxide, said metal being optionally chosen among Cu, Ni, or others.

12. The method according to claim 1, wherein the detector device used in step (ii) a cavity Ring Down infra-red spectrometer.

13. The method according to claim 1, wherein the test sample is a mixture of hydrocarbonaceous organic compounds of vegetal, animal or fossil origin.

14. The method according to claim 1, wherein the test sample is chosen among (1) synthetic crude or fractions thereof; (2) crude petroleum or fractions thereof; (3) refinery off-gas; (4) LPG; (5) monomer containing material such as ethylene, propylene, butene isomers, pentene isomers, hexene isomers, their mixtures, and their mixtures with their corresponding alkanes; (6) pyrolysis gas; (7) naphtha; (8) gasoline; (9) jet-fuel; (10) avgas; (11) diesel fuel; (12) bunker fuel; (13) bitumen; (14) petroleum residue such as light cycle oil, heavy cycle oil, atmospheric residue, vacuum residue, visbroken residue, slurry residue, pet-coke; (15)

optionally hydrogenated oil or wax directly issued from animal, vegetal or algal biomass or waste.

15. The method according to claim 1, wherein the oxidizable reference compound contains C and either N or S.

16. The method according to claim 1, wherein the reference sample comprises As, Se, or Pb.

17. The method according to claim 1, wherein the oxidizing agent is mixed with an inert gas.

18. The method according to claim 1, wherein the oxidizing agent is a metal oxide comprising Cu or Ni.

19. The method according to claim 1, wherein the oxidative reaction is performed in the presence of a catalyst, wherein the catalyst comprises Cu, Ni, or Pt, or a metallic oxide.

20. The method according to claim 19, wherein the metallic oxide is CuO or AgO.

21. A method for operating an industrial unit comprising at least one operation step in which the presence of oxygen and/or the content of oxygen in one or several fluids circulating into the industrial unit is determined by means of the analytical method according to claim 1, said operation being chosen among the management, control, monitoring, startup, shutdown, adjustment and tuning of the industrial unit.

22. The method for operating according to claim 21, wherein the industrial unit is part of a chemical or petrochemical plant.

23. The method for operating according to claim 22, wherein the industrial unit is chosen from (1) a fixed bed catalytic cracker or a fluid catalytic cracker, (2) a steam cracker, (3) a hydrogenating unit working under pressure for hydrogenation of olefins or alkynes, sulfur removal (EDS), oxygen removal (HDO) and/or nitrogen removal (HDN), (4) a hydrocracker, (5) a steam methane reformer, (6) a unit converting alcohols into olefins such as Methanol To Olefins (MTO) unit and MTO/OCP, (7) an isomerisation unit, (8) a visbreaker, (9) an alkylation unit, (10) a bitumen blowing unit, (11) a distillation tower such as atmospheric or vacuum towers, (12) a sulfur recovery unit, (13) an amine washing unit, (14) a hydrocarbon deep conversion unit such as H-Oil, ARDS, coker, slurry hydrocracker, (15) a polymerization unit such as those using ethylene, propylene, styrene, or butadiene monomer and their mixtures, and eventually with at least one other additional monomer, (16) a syngas producing unit, (17) a syngas fed unit such as a Fischer-Tropsch unit.

* * * * *